US008689353B2

(12) United States Patent
Bünter

(10) Patent No.: US 8,689,353 B2
(45) Date of Patent: Apr. 1, 2014

(54) MANAGEMENT OF ACCESS RIGHTS

(75) Inventor: Adrian Bünter, Giswil (CH)

(73) Assignee: Inventio AG, Hergiswil NW (CH)

(*) Notice: Subject to any disclaimer, the term of this patent is extended or adjusted under 35 U.S.C. 154(b) by 0 days.

(21) Appl. No.: 13/433,134

(22) Filed: Mar. 28, 2012

(65) Prior Publication Data

US 2012/0278901 A1 Nov. 1, 2012

(30) Foreign Application Priority Data

Mar. 29, 2011 (EP) .................................... 11160155

(51) Int. Cl.
*G06F 7/04* (2006.01)

(52) U.S. Cl.
USPC ............ 726/28; 726/7; 726/3; 726/2; 726/26; 713/169; 713/153; 713/186; 236/51

(58) Field of Classification Search
USPC ......... 726/1, 4, 15, 26–29; 709/223; 713/186, 713/169, 183
See application file for complete search history.

(56) References Cited

U.S. PATENT DOCUMENTS

| | | | | |
|---|---|---|---|---|
| 7,183,894 | B2 * | 2/2007 | Yui et al. | 340/5.7 |
| 7,831,628 | B1 * | 11/2010 | Silva et al. | 707/802 |
| 8,239,922 | B2 * | 8/2012 | Sullivan et al. | 726/4 |
| 8,266,269 | B2 * | 9/2012 | Short et al. | 709/223 |
| 8,285,669 | B2 * | 10/2012 | Northrup | 707/608 |
| 2002/0099945 | A1 * | 7/2002 | McLintock et al. | 713/186 |
| 2002/0145506 | A1 * | 10/2002 | Sato | 340/5.7 |
| 2009/0138953 | A1 * | 5/2009 | Lyon | 726/9 |
| 2010/0031334 | A1 * | 2/2010 | Shaikh | 726/7 |
| 2010/0122091 | A1 * | 5/2010 | Huang et al. | 713/171 |
| 2012/0180103 | A1 * | 7/2012 | Weik et al. | 726/1 |
| 2013/0056311 | A1 * | 3/2013 | Salmikuukka et al. | 187/380 |

FOREIGN PATENT DOCUMENTS

WO WO 01/76307 A1 10/2001

OTHER PUBLICATIONS

Chia-Sheng Tsai, An enhanced secure mechanism of access control, Jul. 2010, IEEE, vol. 1, pp. 119-122.*
European Search Report dated Jul. 4, 2011, issued in priority European Application No. 11160155.

* cited by examiner

*Primary Examiner* — Cordelia Zecher
*Assistant Examiner* — Viral Lakhia
(74) *Attorney, Agent, or Firm* — Stroock & Stroock & Lavan LLP

(57) ABSTRACT

A system for management of access rights to operating data and/or control data of buildings or building complexes can include a communications release service running on a first server. This release service releases a communication of a user, who is registered with an identity, with the buildings or building complexes filed for him or her in a list when his or her identity corresponds with an identity filed in the list. Also, after release of the communication has taken place by the communications release service, a building authorization service running on a second server releases specific access rights for the user to operating data and/or control data of the building or building complex on the basis of access rights filed in an authorization databank.

14 Claims, 1 Drawing Sheet

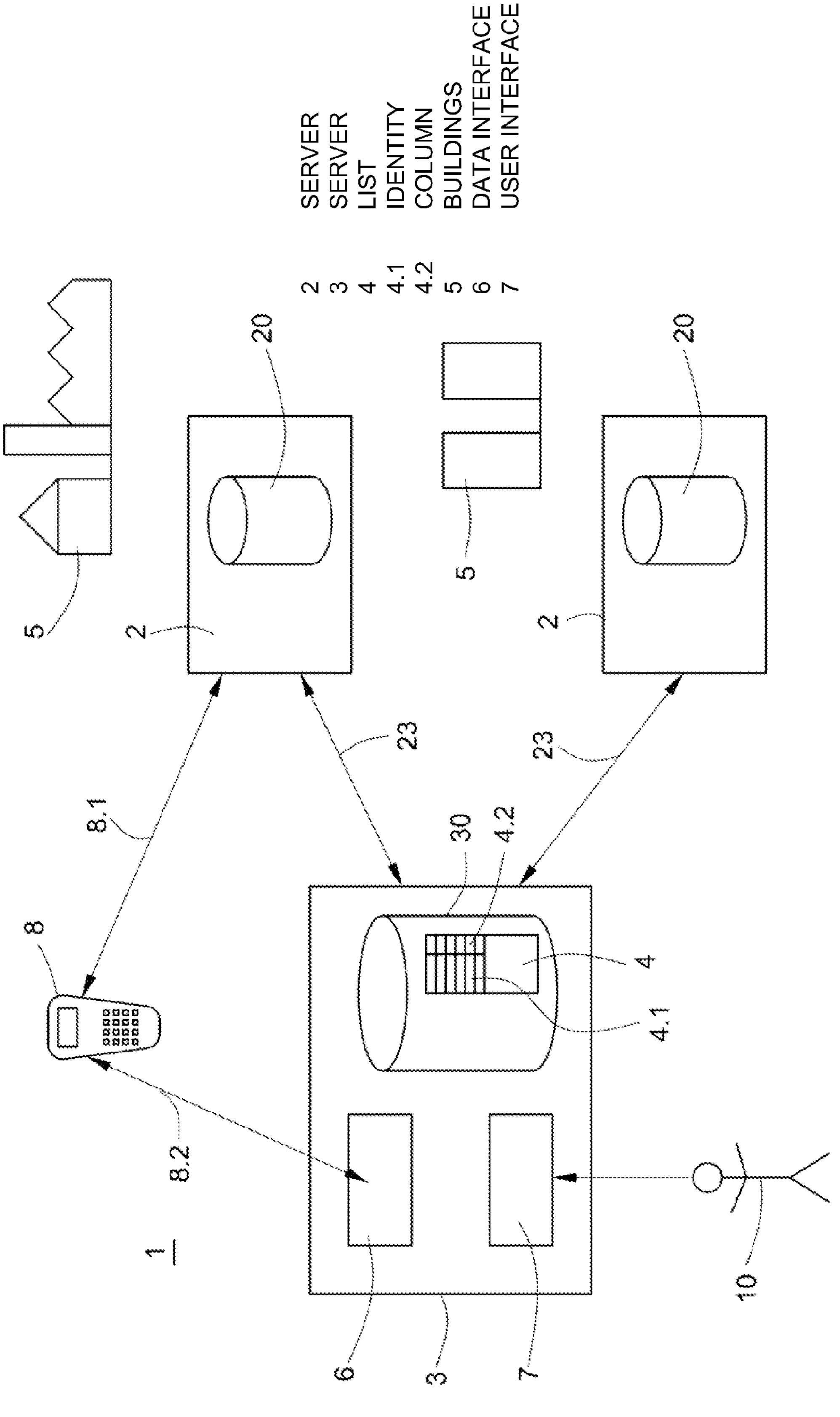
2 SERVER
3 SERVER
4 LIST
4.1 IDENTITY
4.2 COLUMN
5 BUILDINGS
6 DATA INTERFACE
7 USER INTERFACE
1
2
3
4
4.1
4.2
5
6
7
8
8.1
8.2
10
20
23
30

MANAGEMENT OF ACCESS RIGHTS

CROSS-REFERENCE TO RELATED APPLICATION

This application claims priority to European Patent Application No. 11160155.5, filed Mar. 29, 2011, which is incorporated herein by reference.

FIELD

The disclosure relates to management of access rights to operating data and/or control data of buildings or building complexes.

BACKGROUND

In buildings or building complexes, increasing numbers of functions such as, for example, operation of shutters or blinds, operation of an air-conditioning installation with associated functions such as heating, cooling and ventilating, are currently undertaken by modern control systems, which automate the operation. Similarly, for example, access controls to parts of buildings or buildings of a campus are realized by centrally stored data. Moreover, in many buildings or building complexes there are installations such as, for example, elevators or escalators which are themselves controlled by controls which regulate the function of the installation. Overall, increasing amounts of operating data and also control data for the various mentioned systems are currently available in buildings.

In some cases, there is also an increasing requirement for access to these building-specific and component-specific data to be able to be carried out from another location, thus remotely. In this regard, it is conceivable that there is access merely to status data, but it can also be desirable for manipulation of control data to be able to be undertaken by way of remote access; for example, updating of software capable of running on a control can be carried out by way of remote access.

However, in some cases, a remote access of that kind to building-specific data may take place only on a selective basis, so that access is made possible only to those persons who also have access rights for the access. Moreover, in this regard an access right which is specific with respect to the role of a person can be desired for that person. However, an access physically restricted in the building to specific building parts or rooms can also be desired.

At present, access rights are usually allocated and granted for individual installations or components. In that case, access of an authorized user usually takes place by way of interfaces, which are provided by building operators, to the respective systems or installations.

SUMMARY

Some embodiments comprise a system for management of access rights to operating and/or control data of buildings or building complexes, wherein the system comprises the following: a first server for a building authorization service with at least one authorization databank for storage of user-specific access rights for specific buildings or building complexes, a second server for a communications release service with an authentication databank for storage of users registered in the system, wherein the authentication databank has a list of all users furnished with user-specific access rights, wherein filed in the list for each user furnished with access rights are those buildings or building complexes for which the user has access rights, wherein the communications release service is provided for release of communication of a user with the buildings or building complexes filed for him or her in the list and wherein the building authorization service is provided for release of the specific access rights for the user to operating and/or control data of the building or building complex on the basis of the access rights filed in the authorization databank.

Further embodiments comprise a method of operating a system for management of access rights to operating and/or control data of buildings or building complexes, in which a communications release service running on a first server releases communication of a user, who is registered with an identity, with the buildings or building complexes filed for him or her in a list when his or her identity corresponds with an identity filed in the list, and a building authorization service running on a second server releases, after release of the communication has taken place by the communications release service, specific access rights for the user to operating and/or control data of the building or the building complex on the basis of access rights filed in an authentication databank.

At least some embodiments enable access rights to building-specific data by way of a system in which the authentication of a user who would like to have access to the data takes place separately from the specific access rights stored for the corresponding user. The authentication of a registered user can thus be carried out by way of an application, for example by way of a web application which is made available by a service provider. In this regard, the service regulating the authentication of the user does not need any special items of information with regard to which specific data or data sources the user has access to. Equally, no information about the special role which the user fulfills in the system is necessarily needed. It merely has to be ascertained by the authentication service whether the user is actually registered and is permitted the access, i.e. the communication with a specific building or building complex. The operator of the system thus does not have to have confidential data.

The confidential data can, instead, be directly managed by the building management. For this purpose the users registered in the system are filed together with the identity thereof and also the role thereof, i.e. which function they may perform and what they may do with the data released for communication. Equally, there is storage of the scope of authorization rights they have. The specific data maintenance can thus be performed independently by the building management on site. A registration of the user of the system can, however, be undertaken at a central point by way of the authorization service for the respective building recorded in the system.

Access of users to the most diverse buildings or building complexes which are managed in the system can also thereby be made possible in a simple manner. The user thus has, through a single identity by which he or she is filed in the system, the possibility of accessing different buildings of different owners and there calling up operating data or also undertaking interventions such as data updating. The system can be of advantage particularly for service operations, because, for example a service engineer gains, by way of a single registration in the system, access to diagnostic data of the most diverse buildings or building complexes. A service engineer can, for example, thereby interrogate, by way of single application, the status of specific system components in the different buildings before his or her visit to the location and already undertake beforehand the necessary measures or order necessary replacement parts. Overall, the system can enable a simple and uniform access to building-specific data and a simple management of necessary access rights to several buildings or building complexes.

In further embodiments, the communications release service runs on a central server and is provided for release of communication of registered users for several buildings or building complexes, each building or each building complex has an individual decentralized server for the building authorization service, and a communications connection is provided between the central server and the decentralized server. If a user of the system is registered with his or her identity with the communications release service on the central server then it merely has to be checked here whether access rights to one or more buildings or building complexes do indeed exist. If this is the case, then a communication is sent by the central server to the decentralized server having the specific access rights of the user. Communication with the building can thus be released for the user and if the user is registered for several buildings or building complexes then the communication can also be released for several buildings or building complexes. It is then merely ascertained on the decentralized server or servers which specific access right for the user, who has been registered and released for communication, exists and these data are then released for communication to him or her.

In further embodiments, the communications release service has at least one data interface for reception of identities of the users stored with user-specific access rights in an authorization databank of a building authorization service. This is particularly advantageous, since the users are filed together with their user-specific access rights on the decentralized server or the authorization databank of the decentralized server. In this regard, the users are filed together with their identities, their roles and the scope of data to which they may have access. After storage has taken place of a user with his or her user-specific access rights the identity of the user can now be received by the communications release service via the data interface of the communications release service and stored in the list in which the identities of the users together with access rights are filed. In this manner it can be ensured that the user identity stored in the communications release service is identical with the user identity stored for the user in the authorization databank of the corresponding building or building complex. An identity once allocated by the building authorization service is thus used by the communications release service for authentication. The data interface can in this regard be so constructed that a communication, which is transmitted by the decentralized server, with the identity of the user and the password of the building can be received directly, for example by way of the Internet. It is also conceivable for the data interface to be so constructed that, for example, communication with a mobile telephone takes place, wherein the mobile telephone communicates its identity and this identity is simultaneously filed as the identity of the user in the system not only on the authorization databank, but also on the authentication databank. The communications release service can obviously have several interfaces which enable reception of transmitted identities of different communications media. Overall, all identities received by way of interfaces of that kind can be stored in the list.

In additional embodiments, the communications release service has a user interface for registration by a user by means of an identity. The user thereby only has to use the identity which has been granted to him or her by the building authorization service or which corresponds with the identity of his or her mobile telephone. The registration can be carried out centrally by way of an application provided by the communications release service. The user thus always has the same 'look and feel' and a simple interaction with the system is possible.

In further embodiments, the user interface is provided for provision of a user background matched to the user-specific access rights. Once communication by the communications release service has been made possible, then the decentralized server or the building authorization service transmits an item of information in which is filed which of the user-specific backgrounds, which are available in the system, is best suited to the operation of the system. For example, depending on the role of a user there can be provided an interface on which data can be merely read by the user. The interface can be static, so that the user has no possibility of creating knowledge beyond that provided by the building management. However, the user interface can also be designed to be dynamic and enable interaction with the user so that he or she can navigate in different hierarchies of the operating data structure. Moreover, the user interface can be so designed that manipulation of or intervention in the data is made possible for the user. For example, it is conceivable for the user to be able to change threshold values by way of the system and it is also conceivable for the user to be able to load software updates. In some cases it can be advantageous if the user-specific user background is provided only when the communication for the user is also released and it is known in the system which user interface is the interface matching his or her access rights.

The different user interfaces can themselves be exclusively provided by the communications release service and also stored only there. It merely has to be registered by the building authorization service which user interface is suitable for the role or scope demanded by the user. The communications release service thus also does not have to have confidential data of the individual users for the provision of the user-specific user interface. Also sufficient with respect thereto are merely the identity and the subsequent transmission of the preferred user interface by the building authorization service. A simple handling of the user interface by the operator of the service is thereby also possible. The user interfaces can be set up centrally and also changed.

In further embodiments, the user interface is provided for provision of a selection of user-specific roles already at the time of registration by a user. The user can thereby limit just which of the different applications for the communication of the building-specific data are useful or necessary for him or her. He or she can already select on the user interface whether he or she is merely a visitor, whether he or she needs access to control data, whether he or she would, for example, like to change an elevator configuration or whether he or she would merely like to be informed about the performance of the system by means of a scorecard in which the metrics are recorded. He or she can alternatively also indicate whether he or she would like to undertake remote maintenance. In all these specific applications there is made available to the user merely data corresponding with his or her selected instantaneous role. This can be advantageous for a user who has extensive rights and therefore no specific role in the system, so that a user-specific interface can be made available by the system solely on the basis of his or her role. In this case the user himself or herself slips into the appropriate role so that the provided data are appropriately adapted to the role selected by him or her.

BRIEF DESCRIPTION OF THE DRAWING

The disclosed technologies are described in more detail and explained in the following by way of the FIGURE:

FIG. 1 shows a schematic illustration of the system for management of access rights.

DETAILED DESCRIPTION

The system 1 for management of access rights to operating and/or control data of buildings or building complexes 5 comprises a first server 2 on which a building authorization service runs. The server 2 has one or more authorization databanks 20. User-specific access rights for specific buildings or building complexes 5 are stored in the authorization databank or databanks 20. In this regard, for example, an identity for a user 10 of the system 1 is filed. Filed additionally to the identity of the user 10 is which role the user 10 has. For example, the role can be restricted and the user has only rights to read data which are generated or present in different components of the building or the building complex 5. The role can, however, also consist of the user being able to manipulate data of the building complex 5. Apart from the role, there can be further added to the identity of the user in the authorization databank 10 an entry in which the physical scope of his or her access rights is defined. For example, a user can have access rights only to specific buildings of a building complex or only access rights to specific system components within a building complex, for example exclusively elevators or exclusively building automatic systems or exclusively to the heating installation.

The system 1 further comprises a second server 3 on which a communications release service runs. The second server 3 has an authentication databank 30. All users registered in the system 1 are filed together with their identity 4.1 in a list 4 in this databank. In addition, added to each identity of a user in the list 4 is the building or building complex 5 to which the user may access by means of a communication via the communications connection 23. The second server 3 can in this regard be operated centrally by a service provider, whereas the first servers 2 are decentrally arranged in the system 1. The first servers 2 can in this case be at any locations selected by a customer of the system. The first servers 2 can, however, also be directly accommodated in the buildings or building complexes.

The user 10 can access the operating or control data of the buildings or building complexes by way of the user port or user interface 7 arranged on the second server 3 and provided by the communications release service. For this purpose the user 10 registers at the user interface 7 by his or her identity which he or she has in the system. The communications release service checks whether the identity corresponds with an identity filed in the list 4. If this is the case, then there is determined from the column 4.2 of the list 4 those buildings or building complexes 5 for which the user has access rights. Communication with the building or building complex or several buildings or building complexes filed in the column 4.2 is subsequently released to the user. (The term "release" is used in this application and in the claims in the sense of "granting access" and/or "sharing.") The user can now access the data of the building or building complex by way of the communications connection 23. On site, however, there is granted to the user only the access rights which are filed on the first server 2 in the authorization databank. The basic communications possibility is thus made possible to the user 10 by the authentication service with the help of the items of information which are filed in the authentication databank and which then grant specific data access to the user 10 with the help of the building authorization service on the basis of the items of information filed in the authorization databank 20. A separation of the authentication and the authorization is achieved in this manner. By way of a uniform service, the authentication service, access to different buildings or building complexes is made possible without this authentication service having to have confidential data. In at least some embodiments, merely the user-specific roles and access rights are filed on the first server 2 in the building authorization service.

The registration of a new user for access to a building or building complex 5 can take place in different ways. The user 10 can, for example, register at the authentication service by way of the user interface 7. However, he or she has to be authorized by the building management of the building to which he or she would like to have access rights so that the authentication service can release him or her for communication by way of the communications connection 23. For this purpose there is allocated by the building management to the user an identity which corresponds with that with which he or she has registered in the authentication service. This identity is assigned a role and the scope by the building management. The data are filed on the first server 2 in the authorization databank 20. If the user 10 is registered by the building management and filed in the databank 20 then a communication is sent by the building authorization service to the authentication service. The authentication service thereupon records the identity of the user in the list 4 on the authentication databank 30. The authentication service records in the column 4.2 the building password of the building or building complex 5 from which the communication was sent. The user 10 is now filed in the system 1 together with his or her identity and the buildings to which he or she can gain access.

Any desired standard communication can be used for the communication between the first server 2 and the second server 3. For example, a communication by way of the Internet is possible, but is also conceivable for the communication to take place by way of a telecommunications line or a direct line. The communication can in that case be carried out in wire-bound manner or also by way of radio.

The registration of a user 10 can also be carried by way of an apparatus which has an identity and is capable of communication, i.e. transmitting and receiving data. In this regard, it can be, for example, a mobile telephone, an i-phone or i-pad. A registration on the first server 2 is then undertaken by the user 10 with the help of the communications apparatus 8. The communications apparatus in that case transmits his or her identity to the first server 2 by way of a communications connection 8.1. This takes place in conjunction with interrogation of the user with regard to whether access rights are granted to him or her. The identity of the user, in this case the identity of his or her communications apparatus, and the role allocated to this identity and the scope thereof are now filed by the building management in the building authorization service as in the already explained case. Filing takes place in the authorization databank 20. The building authorization service subsequently transmits to the communications apparatus 8 by way of the communications connection 8.1 a coded communication in which the identity is filed. Apart from the identity, there is noted in the coded communication from which building this communication emanates, i.e. the building password is filed, which together with the identity makes possible by way of the authentication service an access to the respective building or to the building complex 5. The communications apparatus 8 now communicates the coded communication to a data interface 6 of the authentication service running on the second server. In this regard, use is made of a further communications connection. The authentication service after receipt of the coded communication sends to the communications apparatus 8 a confirmation that the communication has arrived. The coded information is decoded by the authentication service and the identity filed therein of the user 10 together with the password of the building for which he or she was registered is filed in the list 4 on the authentication databank. The coded communication can be, for example, a two-dimensional barcode which is received and can also be transmitted by the mobile apparatus. Other possibilities of communication coding are, however, also conceivable. If the user 10 is now filed in the authentication service on the authentication databank then he or she can now undertake registration in the system 1 by way of the user interface 7 by means of the mobile apparatus, the identity of which is now on the system, and in the case of correspondence of the identity, which is filed in the list 4, of the mobile apparatus with the identity at the time of registration, communication with the building or building complex 5 is made possible for the user by way of the communications connection 23.

The user interface 7 can be designed in many ways. For example, the user interface can have different applications by way of which the user can select a user-specific role already on registration in the system 1 and there is subsequently made available to him or her a user-specific interface optimally matched to his or her requirements. For example, there is made available to somebody who is not to undertake data manipulation, but is merely to read data, an interface which has no input possibilities. If somebody has to manipulate data, for example adjust threshold values, then there is made available to him or her user interfaces by way of which he or she can actuate an appropriate data input. The changed data are then communicated by way of the communications connection 23 to the building or the building complex and there the data change is undertaken in the different components, which are installed in the building, in accordance with the respective rights of the user. In this regard a very specific operating and observation interface can be provided for the user by the authorization service. All customary possibilities of visualization or access are in that case given to the user. Thus, a user can connect with the authentication service or the interface of the authentication services by way of the Internet, by way of VPN, by way of Facebook, by way of Twitter or by way of a normal telecommunications connection and communicate with the building or the building complex by way of the interface which is then indicated in his or her respective background.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. An access rights management system for data of one or more buildings, the system comprising:

a first server, the first server being for a building authorization service, the first server comprising an authorization databank for storing respective user-specific access rights of users to the one or more buildings; and a second server, the second server being for a communications release service, the second server comprising an authentication databank, the authentication databank storing a list of the users and of which of the one or more buildings the users have the respective user-specific access rights for, the second server being programmed to allow a selected user to communicate with the one or more buildings by enabling the selected user to access the first server according to the list stored in the authentication databank, and the first server being programmed to grant one or more of the user-specific access rights for the selected user according to the user-specific access rights stored in the authorization databank, and enabling a separation of the authentication and the authorization by the first and second servers.

2. The system of claim 1, wherein the second server is a central server for user authentication of a plurality of buildings.

3. The system of claim 1, the second server further comprising a data interface, the second server being further programmed to receive identification information for the selected user through the data interface.

4. The system of claim 1, the second server further comprising a user interface, the second server being further programmed to register the selected user through the user interface.

5. The system of claim 4, the user interface being configured to receive information for a user background of the selected user.

6. The system of claim 4, the user interface being configured to receive a selection of a user-specific role for the selected user.

7. The system of claim 1, the data of the one or more buildings comprising operating data.

8. The system of claim 1, the data of the one or more buildings comprising control data.

9. An access rights management method for data of one or more buildings, the method comprising:

receiving, using a first server, a request to allow a user to communicate with a second server, the second server being programmed to provide access to the data of the one or more buildings, the second server storing a description of user-specific access rights to the one or more buildings for the user;

determining, using the first server and based on a list of users having access rights for the one or more buildings, that the user has access rights for the one or more buildings; and as a result of the determining and using the first server, allowing the user to communicate with the second server, and enabling a separation of the access to the data and the user specific access rights to the one or more buildings by the first and second servers.

10. The method of claim 9, the description of user-specific access rights comprising a role for the user.

11. The method of claim 9, the description of user-specific access rights comprising a scope of the access rights for the user.

12. The method of claim 9, the allowing the user to communicated with the second server comprising sending an identity of the user from the first server to the second server.

13. The method of claim 9, the first server being communicatively coupled to the second server, wherein the first server is a central server for user authentication of a plurality of buildings.

14. One or more non-transitory computer-readable storage media readable by a server and having encoded thereon instructions that, when executed by the server, cause the server to perform the method of claim 9.

* * * * *